United States Patent
Chen et al.

(10) Patent No.: US 12,386,665 B2
(45) Date of Patent: Aug. 12, 2025

(54) METHOD FOR MANAGING RESOURCES, COMPUTING DEVICE AND COMPUTER-READABLE STORAGE MEDIUM

(71) Applicant: Shanghai Biren Technology Co., Ltd, Shanghai (CN)

(72) Inventors: Long Chen, Shanghai (CN); HaiChuan Wang, Shanghai (CN); GuoFang Jiao, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 902 days.

(21) Appl. No.: 17/519,484

(22) Filed: Nov. 4, 2021

(65) Prior Publication Data

US 2022/0164232 A1 May 26, 2022

(30) Foreign Application Priority Data

Nov. 26, 2020 (CN) .......................... 202011347122.X (51) Int. Cl.
  *G06F 9/50* (2006.01)
  *G06F 9/48* (2006.01)

(52) U.S. Cl.
  CPC .......... *G06F 9/5022* (2013.01); *G06F 9/4881* (2013.01)

(58) Field of Classification Search
  CPC ................ G06F 9/5022; G06F 9/4881; G06F 2209/483; G06F 2209/549; G06F 9/544; G06F 9/5027; G06F 9/5005; G06F 8/76
  See application file for complete search history.

(56) References Cited

U.S. PATENT DOCUMENTS

| | | | |
|---|---|---|---|
| 10,848,568 B1 * | 11/2020 | Ozerov | H04L 67/14 |
| 2005/0289559 A1 * | 12/2005 | Illowsky | G06F 9/54 719/318 |
| 2006/0026305 A1 * | 2/2006 | Illowsky | G06F 9/5027 710/8 |
| 2007/0094561 A1 * | 4/2007 | Udell | G01R 31/318314 714/738 |
| 2007/0266385 A1 * | 11/2007 | Flautner | G06F 1/324 718/102 |

(Continued)

*Primary Examiner* — Umut Onat
*Assistant Examiner* — Phuong N Hoang
(74) *Attorney, Agent, or Firm* — JCIP GLOBAL INC.

(57) ABSTRACT

A method for managing resources, a computing device, and a computer-readable storage medium are provided. The method includes obtaining device information of multiple physical devices included in a computing node to confirm physical devices supporting a predetermined hardware resource management method; initializing at least one physical device among the physical devices supporting the predetermined hardware resource management method as a unified device view device; allocating a virtual storage address of the unified device view device, where the virtual storage address is mapped to a physical storage address of the physical device participating in the unified device view; transmitting data to the virtual storage address of the unified device view device; and issuing a computing task to the unified device view device via a task queue for using the physical device participating in the unified device view to execute the computing task.

10 Claims, 5 Drawing Sheets

(56) References Cited

U.S. PATENT DOCUMENTS

| | | | |
|---|---|---|---|
| 2011/0239011 A1* | 9/2011 | Waris | H04L 67/59 |
| | | | 713/323 |
| 2015/0121391 A1* | 4/2015 | Wang | G06F 9/5044 |
| | | | 718/104 |
| 2016/0085719 A1* | 3/2016 | Park | G06F 15/7828 |
| | | | 712/32 |
| 2016/0234730 A1* | 8/2016 | John | H04W 36/0033 |
| 2017/0134304 A1* | 5/2017 | Lin | H04L 67/1097 |
| 2019/0278714 A1* | 9/2019 | Poothia | G06F 12/109 |
| 2022/0345474 A1* | 10/2022 | Zilbershtein | H04N 21/26613 |

* cited by examiner

METHOD FOR MANAGING RESOURCES, COMPUTING DEVICE AND COMPUTER-READABLE STORAGE MEDIUM

CROSS-REFERENCE TO RELATED APPLICATION

This application claims the priority benefit of China application serial no. 202011347122.X, filed on Nov. 26, 2020. The entirety of the above-mentioned patent application is hereby incorporated by reference herein and made a part of this specification.

BACKGROUND

Technical Field

The disclosure relates to the field of information processing, and in particular, relates to a method for managing resources, a computing device, and a computer-readable storage medium.

Description of Related Art

Multi-device systems (such as but not limited to multi-graphics processor systems) are widely used in the fields of machine learning and big data processing. In a conventional resource management method for a multi-device system, for example, explicit operations are required to be performed on each device among a plurality of devices included in the system. These operations include, for example, configuring computing tasks for specific physical devices, performing data segmentation, performing cross-device data access and movement, and synchronizing multiple devices, and so on. Nevertheless, these operations make the overall control and resource management process of the multi-device system cumbersome, and incorrect logic may also be easily introduced. As such, the efficiency of software development and maintenance of multi-device system may not be improved.

Further, in the conventional resource management method for multi-device systems, because the code is developed for an existing multi-device system, the code is generally configured with specific device operation logic that is strongly related to a given system. Therefore, when this type of code is migrated to another target multi-device system, if there are differences in configuration between the target multi-device system and the original multi-device system, the code of the original multi-device system must be adaptively changed and re-verified to be applied to the target multi-device system. The speed and quality of code migration are inevitably affected.

In view of the above, the conventional resource management methods for multi-device systems are neither conducive to improving the efficiency of software development and maintenance nor enhancing the speed and quality of code migration.

SUMMARY

The disclosure provides a method for managing resources, a computing device, and a computer-readable storage medium capable of improving efficiency of software development and maintenance and enhancing speed and quality of code migration for a multi-device system.

According to the first aspect of the disclosure, the disclosure provides a method for managing resources. The method includes the following steps. Device information of a plurality of physical devices included in a computing node is obtained to confirm physical devices supporting a predetermined hardware resource management method. At least one physical device among the physical devices supporting the predetermined hardware resource management method is initialized as a unified device view device. The initialized at least one physical device is a physical device participating in a unified device view. A virtual storage address of the unified device view device is allocated. The virtual storage address is mapped to a physical storage address of the physical device participating in the unified device view. Data is transmitted to the virtual storage address of the unified device view device. A computing task is issued to the unified device view device via a task queue for using the physical device participating in the unified device view to execute the computing task.

According to the second aspect of the disclosure, the disclosure further provides a computing device. The device includes at least one processor and at least one storage. The at least one storage is coupled to the at least one processor and stores at least one instruction configured for being executed by the at least one processor. When the instruction is executed by the at least one processor, the device executes the method provided by the first aspect of the disclosure.

According to the third aspect of the disclosure, the disclosure further provides a computer-readable storage medium. The computer readable storage medium stores a computer program. When being executed by a machine, the computer program executes the method provided by the first aspect of the disclosure.

In some embodiments, the step of issuing the computing task to the unified device view device via the task queue includes the following steps. A sum of computing capability of each physical device participating in the unified device view is calculated to determine total computing capability of the physical devices participating in the unified device view. Computing capability of a current physical device participating in the unified device view is calculated, such that a unified device view device driving module determines a task volume of a computing task issued to the current physical device based on the computing capability of the current physical device and the total computing capability.

In some embodiments, the step of calculating the computing capability of the current physical device participating in the unified device view includes the following steps. The computing capability of the current physical device participating in the unified device view is determined based on a number of processors configured in the current physical device, a number of computing units provided by each processor, an operating frequency of the computing units, and computing efficiency of the current physical device.

In some embodiments, the method for information processing further includes the following steps. Before the unified device view device is initialized, a context required by a session is established, and the session is configured for the unified device view device. After the unified device view device is initialized, at least one of the task queue configured for receiving an operation on the unified device view device is arranged. The physical devices participating in the unified device view are synchronized.

In some embodiments, the method for information processing further includes the following step. In response to determining that execution of the computing task is completed, result data related to the computing task is read from the unified device view device.

In some embodiments, the method for information processing further includes the following steps. In response to determining that an instruction for turning off the unified device view device is received, whether the task queue is emptied is determined. In response to determining that the task queue is emptied, the physical devices participating in the unified device view are synchronized, such that the computing task of each physical device participating in the unified device view is completed. The task queue is released. The physical devices participating in the unified device view are released to allow each released physical device to satisfy at least one condition provided as follows: suitable for participating in a session for another unified device view device, and suitable for being used as a separate physical device. The context is released.

In some embodiments, the step of issuing the computing task to the unified device view device via the task queue further includes the following steps. A compiled code and a related parameter are sent to the task queue via an application program interface. A unified device view device driving module determines a physical device configured for completing the computing task to issue the computing task to the determined physical device.

In some embodiments, the step of determining the physical device configured for completing the computing task by the unified device view device driving module further includes the following step. The unified device view device driving module selects one or a plurality of devices configured for completing the computing task among the physical devices participating in the unified device view. Alternatively, the unified device view device driving module evenly issues the computing task to each physical device among the physical devices participating in the unified device view.

In some embodiments, the method for information processing further includes the following step. In response to determining that the physical device configured for completing the computing task is required to access other computing device among the physical devices participating in the unified device view, the unified device view device driving module cooperates with system memory management units of the physical devices participating in the unified device view.

In some embodiments, the method for information processing further includes: the physical devices included in the computing node include a central processing unit and a graphics processing unit, and the computing task is related to machine learning.

It should be understood that the content described in this section is not intended to identify key or important features of the embodiments of the disclosure, nor is it intended to limit the scope of the disclosure. Other features of the disclosure will be easily understood through the following description.

BRIEF DESCRIPTION OF THE DRAWINGS

The drawings are used to better understand the solution, and do not constitute a limitation to the disclosure.

DESCRIPTION OF THE EMBODIMENTS

The exemplary embodiments of the disclosure will be described below with reference to the accompanying drawings. Various details of the embodiments of the disclosure are included to facilitate understanding, but they should be regarded as merely exemplary. Therefore, a person having ordinary skill in the art should realize that various changes and modifications may be made to the embodiments described herein without departing from the scope and spirit of the disclosure. Likewise, for clarity and conciseness, description of commonly-known functions and structures are omitted in the following description.

In the description of the embodiments of the disclosure, the term "including" and other similar terms should be understood as open-ended inclusion, that is, "including but not limited to". The term "based on" should be understood as "based at least in part on". The term "one embodiment" or "the embodiment" should be understood as "at least one embodiment." The terms "first", "second", etc. may refer to different or the same objects. The following may also include other explicit and implicit definitions.

As mentioned above, in a conventional resource management method for a multi-device system, for example, explicit operations are required to be performed on each device among a plurality of devices included in the system. This conventional method is not conducive to improving the efficiency of software development and maintenance for the multi-device system. For instance, if the software processing logic exceeds the resources that a single physical device can provide (including but not limited to, the data that needs to be read exceeds the storage resources on a single device), additional software logic (e.g., task or data cutting, device synchronization, etc.) is required to be constructed to solve the problem of resources limitation of such devices. Further, in the conventional resource management method for multi-device systems, the code is generally configured with specific device operation logic that is strongly related to a given system, such as the number of physical devices used, the hardware resource information of each physical device, and communication and synchronization operations between solidified devices, and so on. When this type of code is migrated to another target multi-device system, if there are differences in configuration between the target multi-device system and the original multi-device system (for example, the numbers of equipped devices are different or the numbers of device hardware resources are different), the code of the original multi-device system must be adaptively changed and re-verified to be applied to the target multi-device system. The speed and quality of code migration are inevitably affected.

In view of the various problems found in the related art, the embodiments of the disclosure provide a solution for resource management, which aims to at least partially solve the aforementioned problems. Hereinafter, the embodiments of the disclosure are described in detail in combination with FIG. 1 to FIG. 5.

Figure 1:
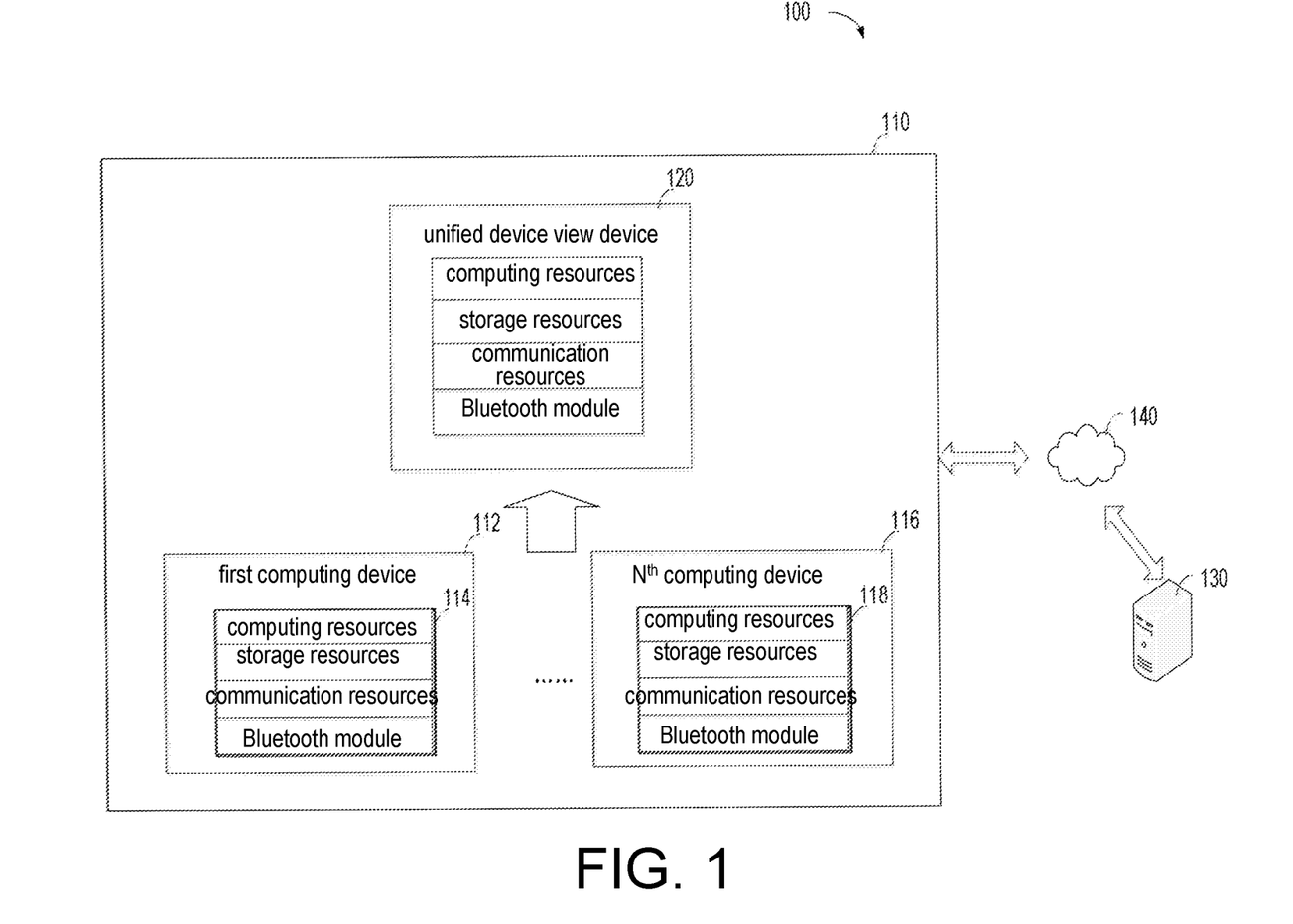
FIG. 1 is a schematic diagram illustrating an exemplary system according to an embodiment of the disclosure.

FIG. 1 is a schematic diagram illustrating a system 100 according to an embodiment of the disclosure. As shown in FIG. 1, the system 100 includes one or a plurality of computing nodes 110 and a server 130. The computing node 110 and the server 130 may perform data exchange through a network 140, for example.

The computing node 110 may be a standalone computing device, such as a completely standalone computer system (standalone system), a desktop computer, or a server. The computing device may also be a computing node of a computer cluster (cluster/data center). The computing node 110 includes, for example, a plurality of physical devices and a network interface. The computing node 110 may be connected to other network devices (e.g., the server 130) via the network interface. The physical devices included in the computing node 110 are, for example, a first physical device 112 to an $N^{th}$ physical device 116 shown in FIG. 1. The physical devices included in the computing node 110 may be homogeneous. For instance, the first physical device 112 to the $N^{th}$ physical device 116 all have the same configuration, such as graphics processing units (GPUs) with the same configuration. The physical devices included in the computing node 110 may also be heterogeneous. For instance, the first physical device 112 to the $N^{th}$ physical device 116 have different physical characteristics, for example, the first physical device 112 is a GPU, and the $N^{th}$ physical device 116 is a field programmable gate array (FPGA).

The computing node 110 is configured to pool hardware resources provided by the physical devices (e.g., a hardware resource 114 of the first physical device 112 and a hardware resource 118 of the $N^{th}$ physical device 116) on a single computing node 110. The computing node 110 abstracts the pooled hardware resources into the form of a single device, that is, a unified device view device 120. As such, the unified device view device 120 owns computing resources, storage resources, communication resources, and other related hardware resources provided by the physical devices. In turn, operations on the single unified device view device 120 may be performed by the physical devices on the single computing node 110 without explicitly operating the physical devices separately by a user. For instance, memory movement between devices, synchronization between devices, and so on are not required to be performed. Only by programming the single unified device view device 120, the hardware resources provided by the homogeneous or heterogeneous physical devices included in the computing node may be used.

Figure 2:
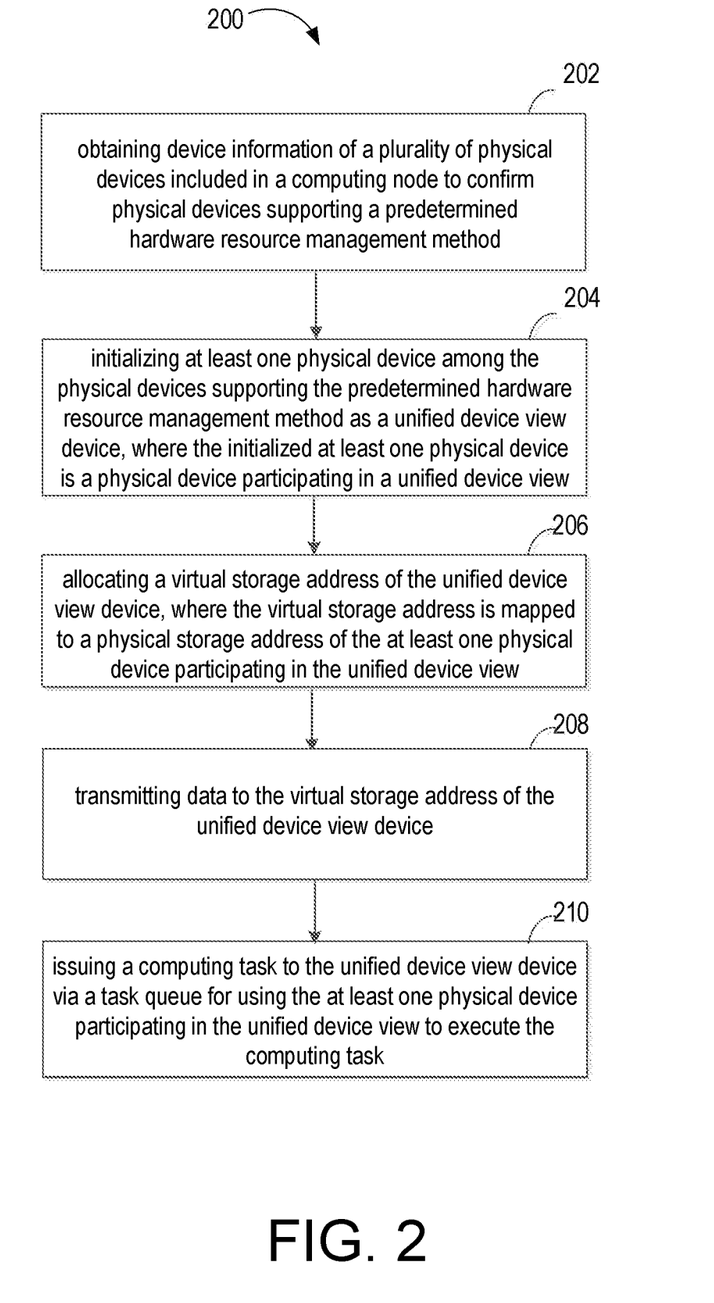
FIG. 2 is flow chart illustrating a method for managing resources according to an embodiment of the disclosure.

FIG. 2 is flow chart illustrating a method 200 for managing resources according to an embodiment of the disclosure. It should be understood that the method 200 may be executed in an electronic device 500 described in FIG. 5, for example, and the method 200 may also be executed in the computing device of the computing node described in FIG. 1. It should be understood that the method 200 may also include additional components and actions that are not shown, and/or the illustrated components and actions can be omitted, and the scope of the disclosure is not limited in this respect.

In step 202, a computing device obtains device information of a plurality of physical devices included in a computing node to confirm physical devices supporting a predetermined hardware resource management method. For instance, the computing device queries physical device information that supports the predetermined hardware resource management method (supporting the management of hardware resources in a unified device view (e.g., "UDV" for short) mode) among the physical devices included in the computing node by calling an application program interface (API) configured for the UDV.

Regarding the predetermined hardware resource management method, it is, for example, a unified device view mode. In this mode, a user or a software developer only needs to operate the abstract "single" unified device view device in the computing node, so as to control the physical devices actually included in the computing node and use the hardware resources provided by these physical devices to complete computing tasks. In other words, through the abstract layer of this unified device view device, the user or the software developer no longer needs to pay attention to the specific situation of each individual physical device in the computing node (the specific situation includes, for example, the number of the devices, whether it is idle, etc.), and does not need to perform separate and explicit operations on these physical devices.

In the operation of determining the physical devices supporting the UDV mode in the computing node, the computing device queries the device information of the physical devices included in the computing node via the API, for example. For instance, the user calls the physical device information related to UDV mode support in the code. The device information returned for the call includes, but not limited to: a number of the physical devices supporting the UDV mode in the computing node, the hardware resource information of the physical devices supporting the UDV mode, and whether physical devices supporting the UDV mode are currently available, and so on.

The timing of determining the physical device supporting the UDV mode may be completed statically during system configuration (single time), may be completed dynamically during system configuration (single time), and may also be completed before each UDV session, or may be completed in other ways.

In step 204, the computing device initializes at least one physical device among the physical devices supporting the predetermined hardware resource management method as a unified device view device, and the initialized at least one physical device is a physical device participating in a unified device view. For instance, in step 202, the computing device determines that the number of physical devices supporting the UDV mode at the computing node is N (N is for example but not limited to 8) and all are available. In this way, all or part of the physical devices supporting the UDV mode may be initialized as a unified device view device.

Regarding the unified device view device, it is generated, for example, by pooling hardware resources provided by the physical devices on a single computing node and abstracting the pooled hardware resources into the form of a single device. The unified device view device may be provided to a user or a program developer in the form of a software API.

A starting method of the unified device view device is that, for example, the user or software developer may start the UDV mode by calling a predetermined API (e.g., UDV API) through a code. To be specific, the computing device may first establish a context required for the UDV session. At least one physical device is then selected as the physical device participating in the UDV mode from the physical devices supporting the predetermined hardware resource management mode (e.g., the UDV mode). After that, the selected at least one physical device is initialized as a unified device view device. At least one task queue configured for receiving an operation on the unified device view device is arranged. The physical devices participating in the unified device view are synchronized. Therefore, in the disclosure, the UDV mode at the computing node may be easily created and started.

Regarding the selection of physical devices participating in the UDV mode, it is allowed to select all physical devices on a single computing node supporting the UDV mode to participate in the UDV mode, and one or more physical devices among the physical devices supporting the UDV mode may also be selected to participate in the UDV mode. Any physical device supporting the UDV mode may participate in a single established UDV session without considering the difference in computing or storage capabilities of specific physical devices.

In some embodiments, the method of initializing the unified device view device includes, for example, querying whether the selected at least one physical device participating in the UDV mode is available.

Regarding the task queue mentioned above (hereinafter referred to as "UDV task queue"), it is mainly used to issue computing tasks or data to be processed for the unified device view device to the corresponding physical device. The created UDV task queue may be multiple or may be one. Multiple UDV task queues may have different priorities. For instance, configuring a UDV task queue with the highest priority among multiple UDV task queues is used to receive and issue high-priority computing tasks. The priorities of the UDV task queues may be pre-set by the programmer via software. The UDV task queue may be achieved in a purely software manner via a hardware driving module, may be achieved in a hardware manner, or a combination of software and hardware.

In some embodiments, in the case that plural physical devices participate in the UDV mode, in some periods, each physical device autonomously runs, for example, a computing task that is issued to the corresponding physical device. There is no need for one of the physical devices to dominate the other physical devices. In some periods, the physical devices participating in the UDV mode need to wait for each other. For instance, it is necessary to wait for the physical devices to complete computing to obtain the correct computing result. Regarding the way of synchronizing the physical devices participating in the unified device view, it is possible to determine whether the corresponding physical device has completed the computing or is idle by means of software or hardware interface.

In step 206, the computing device allocates a virtual storage address of the unified device view device, and the virtual storage address is mapped to a physical storage address of the physical device participating in the unified device view.

Allocation of the virtual storage address on the unified device view device is mainly aimed for allocating the memory required by the program. For instance, the user or developer may call the API to enter the UDV task queue, and the unified device view device driving module determines how to use the pooled hardware resources to allocate the memory required by the program on the physical devices participating in the UDV based on a predetermined algorithm. In this way, the user does not need to specify the actual physical device where the memory is allocated.

Regarding the unified device view device driving module (or "UDV driving module"), it is used to maintain a specific memory mapping relationship, that is, used to maintain the mapping relationship between the virtual address used by a specific program and the physical address on a physical device participating in the UDV mode and ensure that the address mapping relationship on a system memory management unit (SMMU) on each physical device participating in the UDV is consistent.

The method of allocating the virtual storage address of the unified device view device may include the following. For instance, a single physical device is responsible for allocating the memory required by the program, plural physical devices are responsible for evenly allocating the memory required by the program, or plural physical devices are responsible for allocating the memory required by the program in an uneven manner. In some embodiments, the computing device is configured with a default memory allocation method. In some embodiments, the method of content allocation may be determined based on the characteristics of the application.

Before allocation of the virtual storage address of the unified device view device ends, the driving module of the unified device view device is required to perform an implicit (not visible to the developer) synchronization of plural physical devices.

In step 208, the computing device transmits data to the virtual storage address of the unified device view device. For instance, the data (the data may be external data derived from the host memory, hard disk, or other data sources) is transferred to the virtual storage address of the unified device view device allocated in step 206. The data transmission operation is, for example, entering the UDV task queue via an API, and the driving module is, for example, but not limited to, transmitting the data in a linear manner to the virtual storage address of the corresponding unified device view device.

In step 210, the computing device issues a computing task to the unified device view device via a task queue for using the physical device participating in the unified device view to execute the computing task. For instance, the compiled code and related parameters may be issued to the UDV task queue first through the API. The UDV driving module then determines how to use the pooled hardware resources to complete task issuing according to the predetermined algorithm.

The predetermined algorithm used to determine the issued computing task may be determined based on a variety of factors. In some embodiments, the method of determining the issued computing task includes, for example, a sum of computing capability of each physical device participating in the UDV is calculated to determine total computing capability of the physical devices participating in the UDV, and computing capability of a current physical device participating in the UDV is determined, such that the unified device view device driving module determines a task volume of a computing task issued to the current physical device based on the computing capability of the current physical device and the total computing capability. Through the aforementioned means, in the disclosure, the task volume of the computing tasks issued to the physical devices participating in the UDV may be adapted to the current processing power of each physical device. In turn, the resources of the physical devices participating in the UDV may be fully mobilized, and the computing tasks in the task queue are efficiently completed.

In the method of determining the computing capability of a specific (e.g., current) physical device participating in the UDV, for example, the computing capability of the current physical device participating in the unified device view is determined based on a number of processors configured in the current physical device, a number of computing units provided by each processor, an operating frequency of the computing units, and computing efficiency of the current physical device. Herein, the computing efficiency of the current physical device is the actual computing efficiency that the physical device can provide. Through the above technical means, in the disclosure, the current task processing power of each physical device participating in the UDV may be accurately determined.

For instance, for a physical device Intel Core I7, the number of processors configured is, for example, 1, the number of computing units per processor is, for example, 12, the operating frequency of the computing units is, for example, 5.0 GHz, and the computing efficiency of the physical device is, for example, 85%. In another instance, for a physical device Nvidia V100, the number of processors configured is, for example, 80, the number of computing units per processor is, for example, 64, the operating frequency of the computing units is, for example, 1.5 GHz, and the computing efficiency of the physical device is, for example, 70%.

The method for determining the task volume issued to the computing task of an $i^{th}$ (e.g., current) physical device participating in the UDV is specifically described below in combination with formulas (1) and (2).

$$W_i = \frac{\alpha_i * C_i * E_i * F_i}{\sum_{1}^{N} \alpha_i * C_i * E_i * F_i} \quad (1)$$

In the above formula (1), $C_i$ represents the number of processors on the $i^{th}$ physical device. $E_i$ represents the number of computing units provided by each processor on the $i^{th}$ physical device. $F_1$ represents the operating frequency of the computing units on the $i^{th}$ physical device. $\alpha_i$ represents the computing efficiency of the $i^{th}$ physical device. $W_i$ represents the task volume of computing tasks issued by the UDV driving module to the $i^{th}$ physical device. N represents the number of physical devices participating in the UDV.

$$W = \Sigma_1^N W_i \quad (2)$$

In the above formula (2), W represents the total task volume of computing tasks issued to all physical devices participating in the UDV. $W_i$ represents the task volume of the computing tasks issued by the UDV driving module to the $i^{th}$ physical device participating in the UDV mode. N represents the number of physical devices participating in the UDV.

The computing efficiency relates to the task issuing method, which includes, for example, the UDV driving module may select one or more devices from the physical devices participating in the unified device view to complete the computing tasks. For instance, the computing tasks are issued to a single physical device or are issued to multiple physical devices in an uneven manner. The UDV driving module may also evenly issue the computing tasks to each physical device among at least one physical device participating in the UDV mode.

In the process of task computing, if it is determined that the physical device configured for completing the computing task is required to access other computing device among the physical devices participating in the unified device view, the UDV driving module may cooperate with the system memory management units of the physical devices participating in the unified device view.

In the foregoing solution, the hardware resources (including computing resources, storage resources, communication resources, and other hardware resources) provided by the physical devices on a single computing node are pooled, and in this way, the pooled hardware resources may be abstracted into the form of a single device, that is, the unified device view device, and the operation and computing tasks for the unified device view device are issued to the corresponding physical devices participating in the UDV mode for execution through the task queue. In the disclosure, the efficiency of software development and maintenance of the multi-device system may be improved, and the speed and quality of code migration may be enhanced.

In addition, the disclosure allows physical devices supporting the UDV mode to participate in the UDV mode computing, and therefore, supports heterogeneous physical devices to participate in computing. In contrast, in conventional methods such as virtualization, a plurality of virtual machines are virtualized on hardware or a host operating system most of the time. The above virtualization method not only requires the virtualized hardware to have the same configuration, but also requires complex virtualization technologies and processes, such as listening and simulation for high-privileged operations (e.g., I/O operations). In the method for managing resources provided by the disclosure, the heterogeneous physical devices are supported to participate in computing, and efficiency of a single computing node configured with multiple devices in the face of massive computing (such as large network training) is also significantly enhanced.

In some embodiments, the method 200 further includes the following steps. It is determined whether execution of the computing task is completed, and if it is determined that the execution of the computing task is completed, result data related to the computing task is read from the unified device view device. For instance, the (processed) data in the unified device view device is read to the outside of the unified device view device, for example, the data is read to the host memory, hard disk, network device, or other storage components.

The method of data reading operation includes, for example, entering the UDV task queue through the API; and synchronizing the physical devices participating in the UDV mode to determine that the data to be read is the result data after computing is completed.

Figure 3:
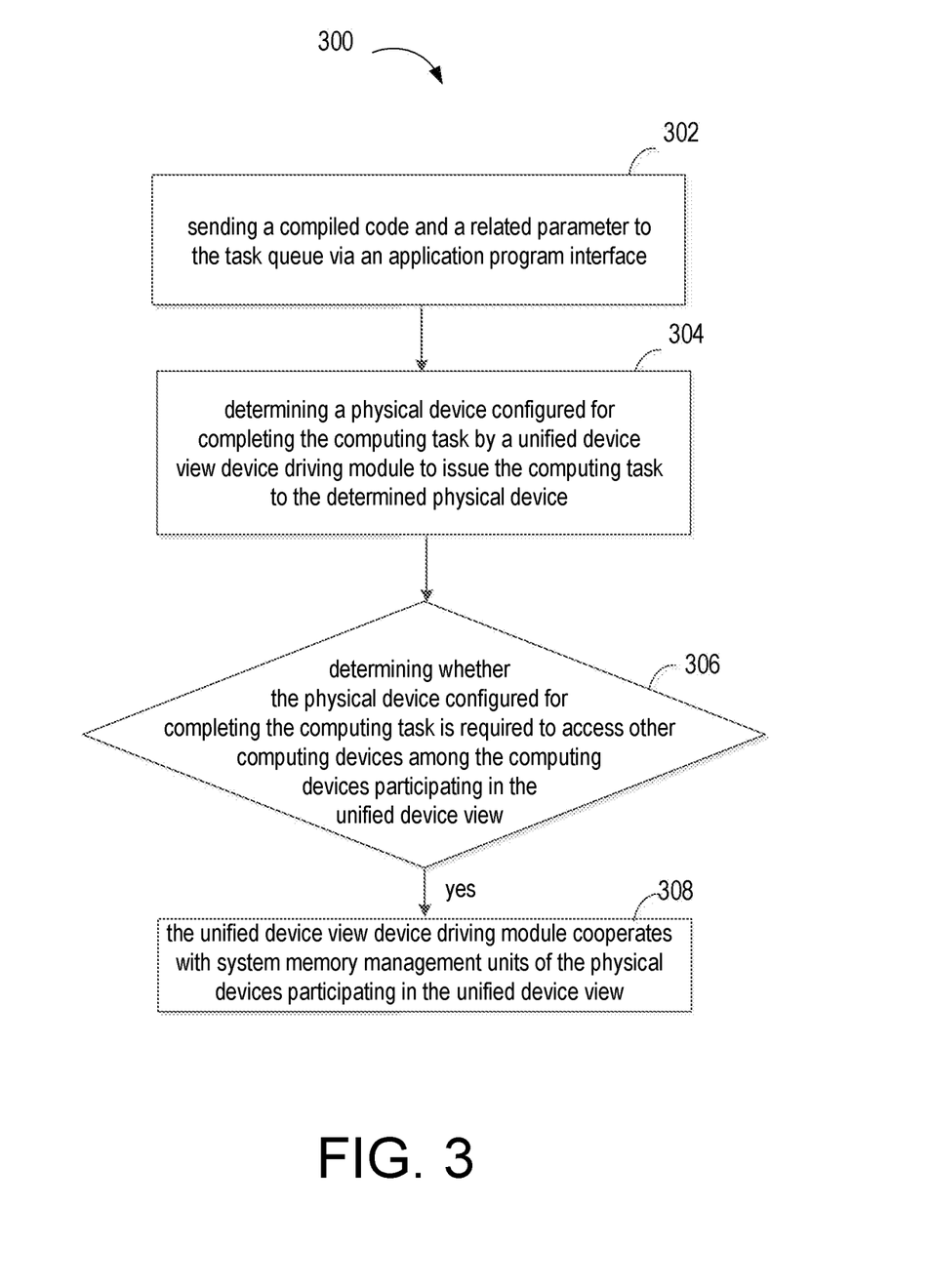
FIG. 3 is a flow chart illustrating a method of issuing of a computing task to a unified device view device according to an embodiment of the disclosure.

FIG. 3 is a flow chart illustrating a method 300 of issuing of a computing task to a unified device view device according to an embodiment of the disclosure. It should be understood that the method 300 may be executed in the electronic device 500 described in FIG. 5, for example, and the method 300 may also be executed in the computing device of the computing node described in FIG. 1. It should be understood that the method 300 may also include additional components and actions that are not shown, and/or the illustrated components and actions can be omitted, and the scope of the disclosure is not limited in this respect.

In step 302, a computing device sends a compiled code and a related parameter to a task queue via an API.

In step 304, a unified device view device driving module determines a physical device configured for completing a computing task to issue the computing task to the determined physical device.

For example, the step of determining the physical device configured for completing the computing task further includes the following. The unified device view device driving module selects one or a plurality of devices configured for completing the computing task among the physical devices participating in the unified device view. Alternatively, the unified device view device driving module evenly issues the computing task to each physical device among the physical devices participating in the unified device view.

In step 306, it is determined whether the physical device configured for completing the computing task is required to access other computing device among the physical devices participating in the unified device view.

In step 308, if it is determined that the physical device configured for completing the computing task is required to access other computing device among the physical devices participating in the unified device view, the unified device view device driving module cooperates with system memory management units of the physical devices participating in the unified device view.

By adopting the above technical means, in the disclosure, the computing tasks for the unified device view devices may be issued to the corresponding computing devices for execution.

Figure 4:
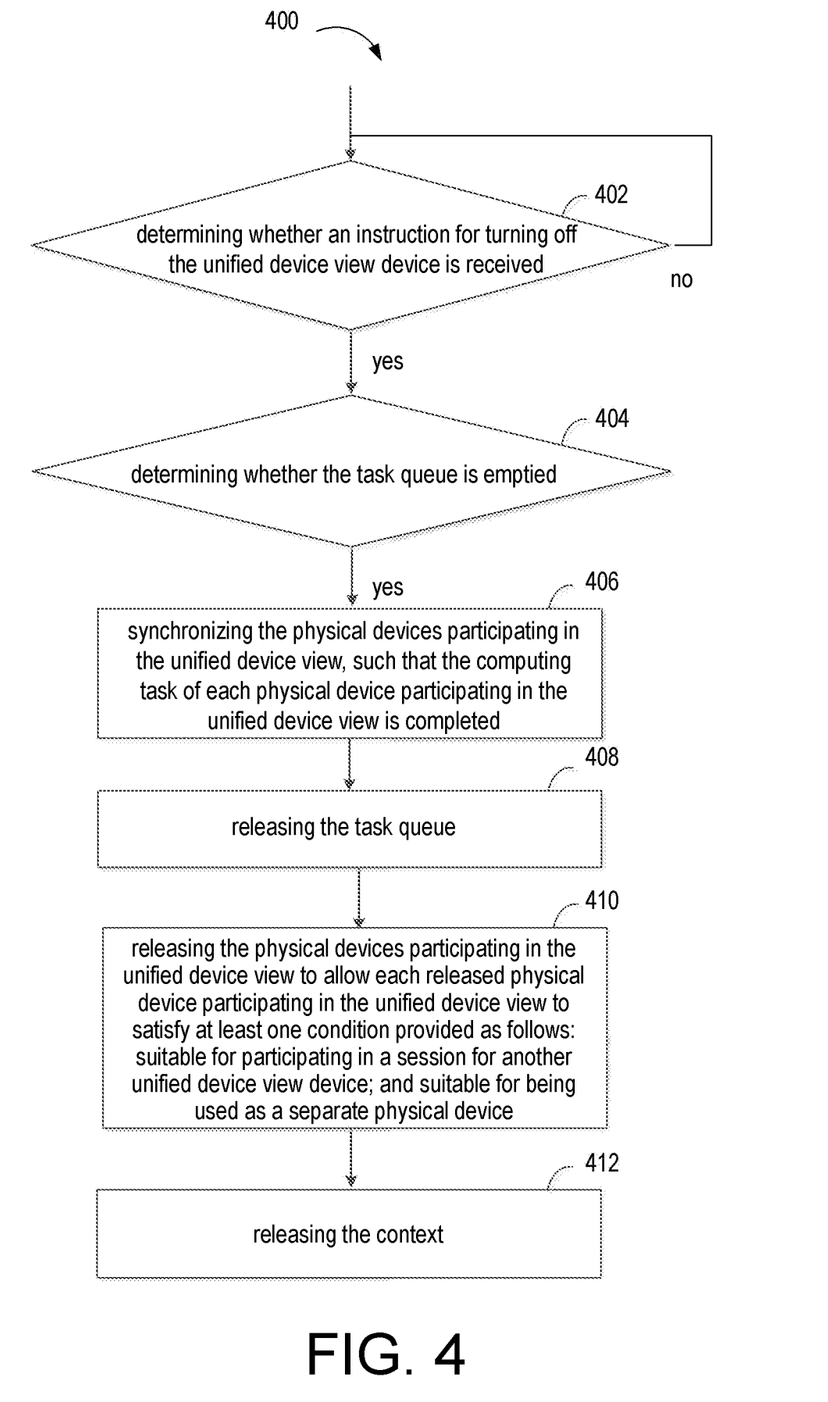
FIG. 4 is a flow chart illustrating a method of turning off the unified device view device according to an embodiment of the disclosure.

FIG. 4 is a flow chart illustrating a method 400 of turning off the unified device view device according to an embodiment of the disclosure. It should be understood that the method 400 may be executed in the electronic device 500 described in FIG. 5, for example, and the method 400 may also be executed in the computing device of the computing node described in FIG. 1. It should be understood that the method 400 may also include additional components and actions that are not shown, and/or the illustrated components and actions can be omitted, and the scope of the disclosure is not limited in this respect.

In step 402, a computing device determines whether an instruction related to turning off a unified device view device is received. If the computing device determines that the instruction related to turning off the unified device view device is not received, the computing device keeps waiting.

In step 404, if the computing device determines that the instruction related to turning off the unified device view device is received, the computing device determines whether the task queue is emptied.

In step 406, if the computing device determines that the task queue is emptied, the computing device synchronizes the physical devices participating in the unified device view, such that the computing task of each physical device among the physical devices participating in the unified device view is completed.

In step 408, the computing device releases the task queue.

In step 410, the computing device releases the physical devices participating in the unified device view, so that each released physical device among the physical devices participating in the unified device view satisfies at least one condition provided as follows: suitable for participating in a session for another unified device view device; and suitable for being used as a separate physical device.

In step 412, the computing device releases the context.

By adopting the aforementioned means, in the disclosure, the multi-device system may be conveniently converted between the mode where physical devices are used separately and the mode where the physical devices are pooled into a unified device view device mode.

Figure 5:
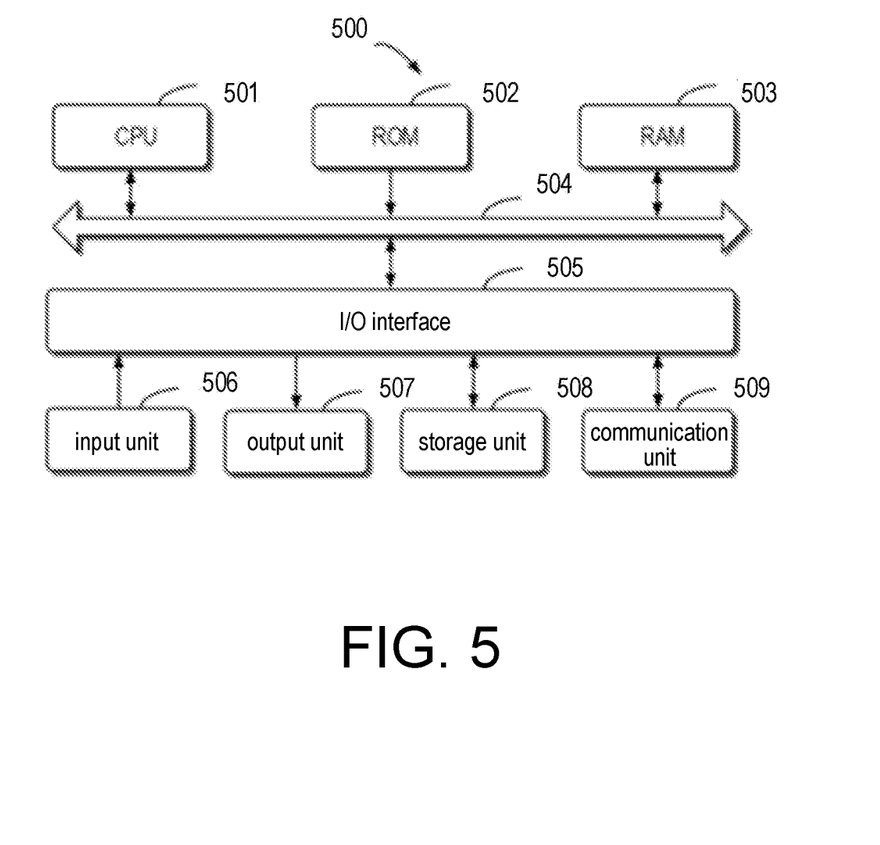
FIG. 5 is a schematic block view of a computing device according to an embodiment of the disclosure.

FIG. 5 is a schematic block view of the computing device 500 according to an embodiment of the disclosure.

As shown in the figure, the computing device 500 includes a central processing unit (CPU) 501 capable of performing various appropriate actions and processing according to computer program instructions stored in a read-only memory (ROM) 502 or computer program instructions loaded from a storage unit 508 to a random access memory (RAM) 503. In the RAM 503, various programs and data required for the operation of the computing device 500 may also be stored. The CPU 501, ROM 502, and RAM 503 are connected to one another through a bus 504. An input/output (I/O) interface 505 is also connected to the bus 504.

A plurality of components in the computing device 500 are connected to the I/O interface 505 and include an input unit 506 (e.g., a keyboard, a mouse, etc.), an output unit 507 (e.g., various types of displays, speakers, etc.), a storage unit 508 (e.g., a disk, a CD, etc.), and a communication unit 509 (e.g., a network card, a modem, a wireless communication transceiver, etc.). The communication unit 509 allows the computing device 500 to exchange information/data with other devices through a computer network such as the Internet and/or various telecommunication networks.

The various processes and processing described above, such as the methods 200, 300, and 400, may be executed by the central processing unit 501. For instance, in some embodiments, the methods 200, 300, and 400 may be implemented as computer software programs, which are tangibly contained in a machine-readable medium, such as the storage unit 508. In some embodiments, part of or all of the computer program may be loaded and/or installed on the computing device 500 via the ROM and/or the communication unit 509. When the computer program is loaded into RAM 503 and is executed by the CPU 501, one or more actions of the methods 200, 300, and 400 described above may be executed.

The disclosure may be a method, a device, a system, and/or a computer program product. The computer program product may include a computer-readable storage medium loaded with computer-readable program instructions for executing various aspects of the disclosure.

The computer-readable storage medium may be a tangible device that may hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination of the foregoing. Specific examples (non-exhaustive list) of the computer-readable storage medium include a portable computer disk, a hard disk, a random access memory (RAM), a read only memory (ROM), an erasable programmable read only memory (EPROM or flash memory), a static random access memory (SRAM), a portable compact disk read-only memory (CD-ROM), a digital versatile disk (DVD), a memory stick, a floppy disk, a mechanical encoding device, a punch card or a raised structure in a groove with instructions stored on it, for example, and any suitable combination of the foregoing. The computer-readable storage medium used herein is not interpreted as a transient signal itself, such as radio waves or other electromagnetic waves which are freely transmitted, electromagnetic waves transmitted through waveguides or other transmission media (e.g., light pulses through fiber optic cables), or electrical signals transmitted through wires.

The computer-readable program instructions described herein may be downloaded from a computer-readable storage medium to various computing/processing devices, or downloaded to an external computer or an external storage device via a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network and forwards the computer-readable program instructions for storage in the computer-readable storage medium in each computing/processing device.

The computer program instructions used to perform the operations of the disclosure may be assembly instructions, instruction set architecture (ISA) instructions, machine instructions, machine-related instructions, microcodes, firmware instructions, state setting data, or source codes or object codes written in any combination of one or more programming languages. The programming languages include object-oriented programming languages (e.g., Smalltalk, C++, etc.) as well as conventional procedural programming languages (e.g., C language or similar programming languages). The computer-readable program instructions may be executed entirely on a user's computer, partly on the user's computer, as a stand-alone software package, partly on the user's computer and partly on a remote computer, or entirely on the remote computer or a server. In the case of a remote computer, the remote computer may be connected to the user's computer through any kind of network, including a local area network (LAN) or a wide area network (WAN) or may be connected to an external computer (for example, using an Internet service provider to be connected via the Internet). In some embodiments, the status information of computer-readable program instructions may be used to personalize and customize an electronic circuit, such as a programmable logic circuit, a field programmable gate array (FPGA), or a programmable logic array (PLA). The electronic circuit may execute the computer-readable program instructions to realize various aspects of the disclosure.

Herein, various aspects of the disclosure are described with reference to flow charts and/or block views of the method, device (system), and computer program product according to the embodiments of the disclosure. It should be understood that the blocks of the flow charts and/or block views and combinations of blocks in the flow charts and/or block views may be implemented by the computer-readable program instructions.

These computer-readable program instructions may be provided to the central processing unit of a general-purpose computer, a special-purpose computer, or other programmable data processing apparatuses to produce a machine. In this way, when these instructions are executed by the central processing unit of a computer or other programmable data processing apparatuses, a device that implements the functions/actions specified in one or more blocks in the flow charts and/or block views is generated. These computer-readable program instructions may also be stored in a computer-readable storage medium, and these instructions cause a computer, a programmable data processing apparatus, and/or other devices to work in a specific manner. As such, the computer-readable medium storing the instructions includes an article of manufacture including instructions for implementing various aspects of the functions/actions specified in one or more blocks in the flow charts and/or block views.

The computer-readable program instructions may also be loaded onto a computer, other programmable data processing apparatuses, or other equipment. In this way, a series of operation steps are executed on the computer, other programmable data processing apparatuses, or other equipment to produce a computer-implemented process. The instructions executed on the computer, other programmable data processing apparatuses, or other equipment may thereby implement the functions/actions specified in one or more blocks in the flow charts and/or block views.

The flow charts and block views in the accompanying drawings show the possible implementation architecture, functions, and operations of the system, method, and computer program product according to the embodiments of the disclosure. In this regard, each block in the flow charts or block views may represent a module, a program segment, or a part of an instruction, and the module, the program segment, or the part of an instruction contains one or more executable instructions for implementing the specified logic function. In some alternative implementations, the functions marked in the blocks may also occur in a different order than the order marked in the drawings. For instance, two consecutive blocks may actually be executed substantially in parallel, or they may sometimes be executed in the reverse order, depending on the functions involved. It should also be noted that each block in the block views and/or flow charts and the combination of the blocks in the block views and/or flow charts may be implemented by a dedicated hardware-based system that performs specified functions or actions, or may be implemented by a combination of dedicated hardware and computer instructions.

It should be understood that the various forms of processes shown above may be used to reorder, add, or delete steps. For instance, the steps described in the disclosure may be executed in parallel, sequentially, or in a different order, as long as the desired result of the technical solution disclosed in the disclosure may be achieved, this is not limited herein.

The foregoing specific implementations do not constitute a limitation on the protection scope of the disclosure. A person having ordinary skill in the art should understand that various modifications, combinations, sub-combinations, and substitutions may be made according to design needs and other factors. Any modifications, equivalent replacements, and modifications made without departing from the spirit and principles of the disclosure should fall within the protection scope of the disclosure.

What is claimed is:

1. A method for managing resources, comprising:

obtaining device information of a plurality of physical devices included in a computing node to confirm physical devices of the plurality of physical devices supporting a predetermined hardware resource management method;

initializing physical devices among the confirmed physical devices supporting the predetermined hardware resource management method as a unified device view device, wherein the initialized physical devices participating in a unified device view;

allocating a virtual storage address of the unified device view device, wherein the virtual storage address is mapped to a physical storage address of each of the initialized physical devices participating in the unified device view;

transmitting data to the virtual storage address of the unified device view device;

issuing a computing task to the unified device view device via a task queue for using the initialized physical devices participating in the unified device view to execute the computing task;

establishing a context required by a session before the unified device view device is initialized, wherein the session is configured for the unified device view device;

arranging at least one of the task queue configured for receiving an operation on the unified device view device after the unified device view device is initialized;

synchronizing the initialized physical devices participating in the unified device view;

determining whether the task queue is emptied in response to determining that an instruction for turning off the unified device view device is received;

synchronizing the initialized physical devices participating in the unified device view in response to determining that the task queue is emptied, such that the computing task of each of the initialized physical devices participating in the unified device view is completed;

releasing the task queue;

releasing the initialized physical devices participating in the unified device view to allow each of the initialized physical devices, which is released, participating in the unified device view to satisfy at least one condition provided as follows: suitable for participating in a session for another unified device view device; and suitable for being used as a separate physical device; and releasing the context.

2. The method according to claim 1, wherein step of issuing the computing task to the unified device view device via the task queue comprises:

calculating a sum of computing capability of each of the initialized physical devices participating in the unified device view to determine total computing capability of the initialized physical devices participating in the unified device view; and calculating computing capability of a current physical device participating in the unified device view such that a unified device view device driving module determines a task volume of the computing task issued to the current physical device based on the computing capability of the current physical device and the total computing capability.

3. The method according to claim 2, wherein step of calculating the computing capability of the current physical device participating in the unified device view comprises:

determining the computing capability of the current physical device participating in the unified device view based on a number of processors configured in the current physical device, a number of computing units provided by each processor, an operating frequency of the computing units, and computing efficiency of the current physical device.

4. The method according to claim 1, further comprising:

reading result data related to the computing task from the unified device view device in response to determining that execution of the computing task is completed.

5. The method according to claim 1, wherein step of issuing the computing task to the unified device view device via the task queue comprises:

sending a compiled code and a related parameter to the task queue via an application program interface; and determining a physical device, which completes the computing task, among the initialized physical devices by a unified device view device driving module to issue the computing task to the determined physical device.

6. The method according to claim 5, wherein step of determining the physical device, which completes the computing task, among the initialized physical devices by the unified device view device driving module comprises:

selecting one or a plurality of devices, which complete the computing task, among the initialized physical devices participating in the unified device view by the unified device view device driving module; or evenly issuing the computing task to each of the initialized physical devices participating in the unified device view by the unified device view device driving module.

7. The method according to claim 5, further comprising:

cooperating with system memory management units of the initialized physical devices participating in the unified device view by the unified device view device driving module in response to determining that the physical device, which completes the computing task, among the initialized physical devices is required to access other computing device among the initialized physical devices participating in the unified device view.

8. The method according to claim 1, wherein the physical devices included in the computing node comprise a central processing unit and a graphics processing unit, and the computing task is related to machine learning.

9. A computing device, comprising:

at least one processor; and a storage configured to communicate with and be connected to the at least one processor, wherein the storage stores at least one instruction executable by the at least one processor, and the instruction is executed by the at least one processor so that the at least one processor executes following steps:

obtaining device information of a plurality of physical devices included in a computing node to confirm physical devices of the plurality of physical devices supporting a predetermined hardware resource management method;

initializing physical devices among the confirmed physical devices supporting the predetermined hardware resource management method as a unified device view device, wherein the initialized physical devices participate in a unified device view;

allocating a virtual storage address of the unified device view device, wherein the virtual storage address is mapped to a physical storage address of each of the initialized physical devices participating in the unified device view;

transmitting data to the virtual storage address of the unified device view device;

issuing a computing task to the unified device view device via a task queue for using the initialized physical devices participating in the unified device view to execute the computing task;

establishing a context required by a session before the unified device view device is initialized, wherein the session is configured for the unified device view device;

arranging at least one of the task queue configured for receiving an operation on the unified device view device after the unified device view device is initialized;

synchronizing the initialized physical devices participating in the unified device view;

determining whether the task queue is emptied in response to determining that an instruction for turning off the unified device view device is received;

synchronizing the initialized physical devices participating in the unified device view in response to determining that the task queue is emptied, such that the computing task of each of the initialized physical devices participating in the unified device view is completed;

releasing the task queue;

releasing the initialized physical devices participating in the unified device view to allow each of the initialized physical devices, which is released, participating in the unified device view to satisfy at least one condition provided as follows: suitable for participating in a session for another unified device view device; and suitable for being used as a separate physical device; and releasing the context.

10. A computer-readable storage medium storing a computer instruction, wherein when the computer instruction is executed by a computer, the computer is enabled to:

obtain device information of a plurality of physical devices included in a computing node to confirm physical devices of the plurality of physical devices supporting a predetermined hardware resource management method;

initialize physical devices among the confirmed physical devices supporting the predetermined hardware resource management method as a unified device view device, wherein the initialized physical devices participate in a unified device view;

allocate a virtual storage address of the unified device view device, wherein the virtual storage address is mapped to a physical storage address of each of the initialized physical devices participating in the unified device view;

transmit data to the virtual storage address of the unified device view device;

issue a computing task to the unified device view device via a task queue for using the initialized physical devices participating in the unified device view to execute the computing task;

establish a context required by a session before the unified device view device is initialized, wherein the session is configured for the unified device view device;

arrange at least one of the task queue configured for receiving an operation on the unified device view device after the unified device view device is initialized;

synchronize the initialized physical devices participating in the unified device view;

determine whether the task queue is emptied in response to determining that an instruction for turning off the unified device view device is received;

synchronize the initialized physical devices participating in the unified device view in response to determining that the task queue is emptied, such that the computing task of each of the initialized physical devices participating in the unified device view is completed;

release the task queue;

release the initialized physical devices participating in the unified device view to allow each of the initialized physical devices, which is released, participating in the unified device view to satisfy at least one condition provided as follows: suitable for participating in a session for another unified device view device; and suitable for being used as a separate physical device; and release the context.

\* \* \* \* \*